United States Patent
Flitz

[11] 3,780,715
[45] Dec. 25, 1973

[54] EARLY FUEL EVAPORATION INTAKE MANIFOLD

[75] Inventor: John L. Flitz, Saginaw, Mich.

[73] Assignee: General Motors Corporation, Detroit, Mich.

[22] Filed: Nov. 30, 1972

[21] Appl. No.: 310,813

[52] U.S. Cl. 123/122 AB, 123/52 MV, 123/122 AC
[51] Int. Cl. F02m 31/08, F02m 31/12
[58] Field of Search ............... 123/122 A, 122 AB, 123/122 AC, 122 H, 122 R, 52 M

[56] References Cited
UNITED STATES PATENTS

| | | | |
|---|---|---|---|
| 1,064,866 | 6/1913 | Stewart | 123/122 AB |
| 1,744,627 | 1/1930 | Hamilton-Grapes | 123/122 AC |
| 1,777,472 | 10/1930 | Mock et al. | 123/122 AB |
| 2,324,592 | 7/1943 | Olson | 123/122 H |
| 2,713,857 | 7/1955 | Keydel | 123/122 A |
| 2,766,748 | 10/1956 | Kern | 123/122 A |
| 2,926,647 | 3/1960 | Welch | 123/122 AB |
| 3,625,190 | 12/1971 | Boisseuain | 123/122 AC |

FOREIGN PATENTS OR APPLICATIONS
563,895   9/1944   Great Britain ............... 123/122 AC Primary Examiner—Al Lawrence Smith
Attorney—J. L. Carpenter et al.

[57] ABSTRACT

An early fuel evaporation intake manifold for an internal combustion engine includes a low thermal mass, thin metal gasket plate clamped between upper and lower manifold castings and having an integral heat exchanger forming the floor of the riser bore plenum. The gasket plate and a cored channel in the lower manifold casting define an exhaust crossover passage having a vertical run incident to the heat exchanger and flaring to a restrictive high aspect-ratio heat transfer duct coextensive with the heat exchanger. The exhaust gases are directed against the heat exchanger at the vertical run and accelerate through the restrictive duct to break up the stagnant fluid film at the heat exchanger for effecting rapid heating thereof to promote greater fuel vaporization during engine warmup.

3 Claims, 7 Drawing Figures

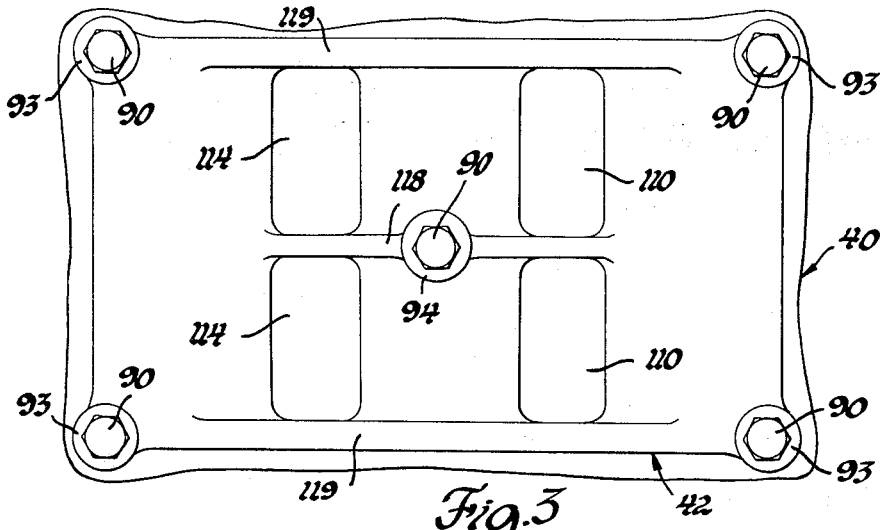
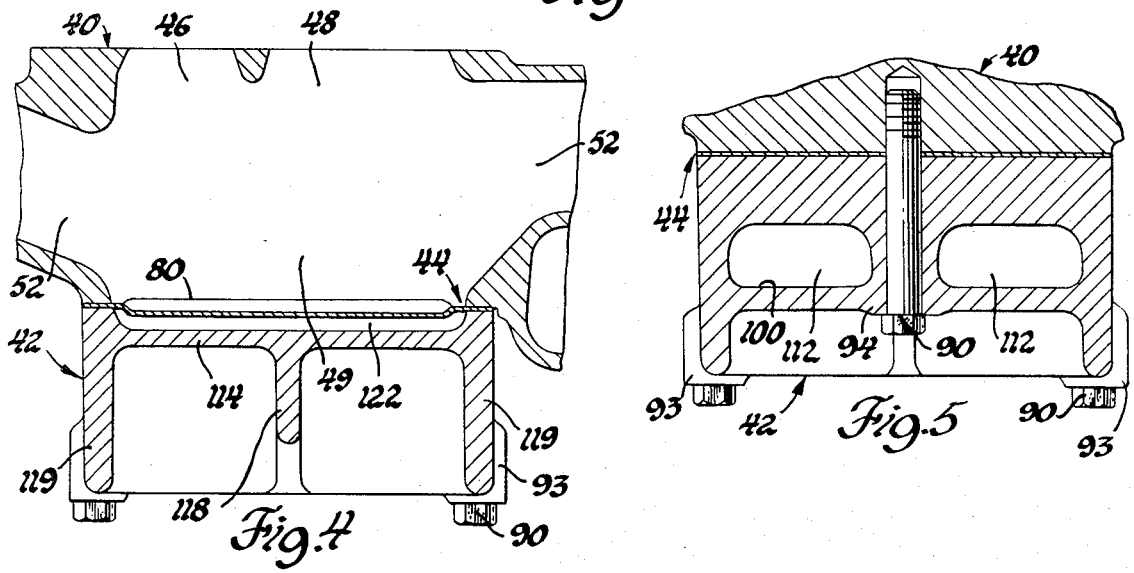
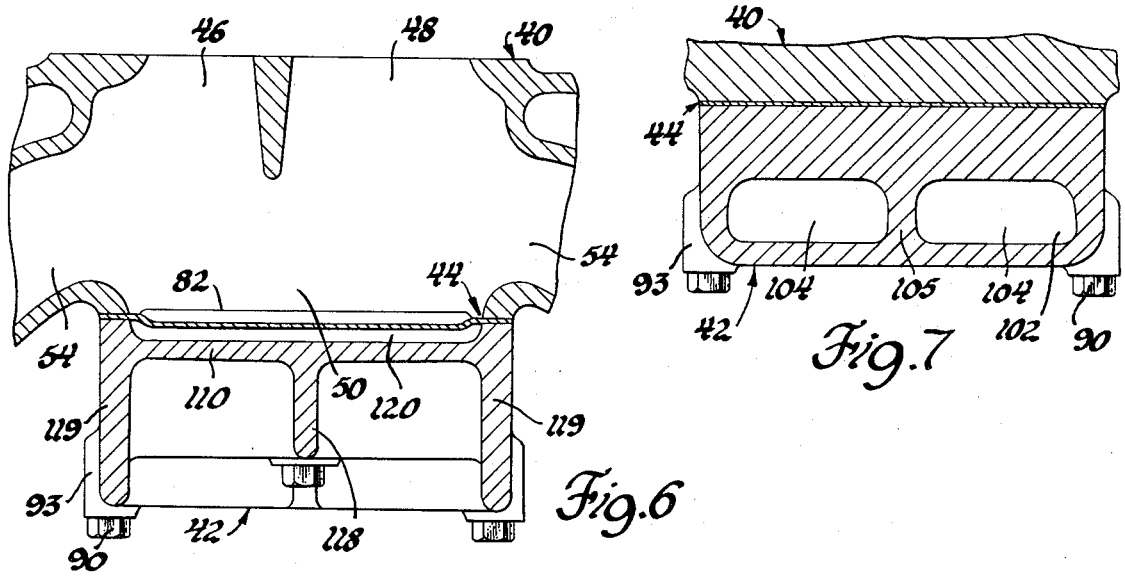

EARLY FUEL EVAPORATION INTAKE MANIFOLD

This invention relates to internal combustion engines and, in particular, to an improved intake manifold construction having provisions for increased fuel vaporization during engine warmup.

Current internal combustion engines include an exhaust crossover passage for routing exhaust gases through the intake manifold to heat the hotplate or floor of a riser bore plenum positioned directly below the carburetor. This promotes vaporization of liquid fuel droplets in the induction fuel mixture. In one construction, the floor is an integral part of the manifold casting and is formed by cores during the casting process. Current core technology imposes limitations on its sectional thickness. This limits the heat transfer capabilities of this construction. A more rapid heating is provided where a separate thin metal plate is substituted for the integrally cast floor. This plate is either bolted or cast in-place in the manifold. In the cast construction unless there is a complete fusion of the plate to the manifold, leakage of the exhaust gases can occur which results in an undesirable exhaust gas recirculation with the induction fuel mixture. When the hotplate is bolted directly in place a thin plate can be used. However, it requires an access opening in the lower surface of the manifold and a separately bolted cover plate and gasket. In both constructions, the crossover passages are substantially non-restrictive resulting in a low flow rate through the passage and against the plate and providing only a gradual heating thereof.

An early fuel evaporation intake manifold construction made in accordance with the present invention comprises a two piece casting having a combination hotplate and gasket clamped therebetween by a single set of bolts. The upper casting includes the conventional induction passages and the inlet and outlet ducts of the exhaust crossover passage. The gasket includes an integral heat exchanger constituting the floor of the riser bore plenum and has openings registering with the inlet and outlet ducts. The lower casting includes a cored channel fluidly communicating exhaust crossover passage inlet and outlet ducts through the openings in the gasket. The gasket and the channel define an exhaust gas crossover flow passage in assembly having a plurality of bends which route the mass flow directly against the lower surface of the heat exchanger. The passage flares horizontally in the vicinity of the heat exchanger to a restrictive high aspect-ratio heat transfer duct which accelerates the exhaust gas flow therethrough. These features provide for maximum thermal interaction between the exhaust gases and the heat exchanger to break up the stagnant film layer and to promote a more rapid heating thereof. This effects more complete fuel vaporization during engine warmup.

The above and other features of the present invention will be apparent to one skilled in the art upon reading the following detailed description, reference being made to the accompanying drawings illustrating a preferred embodiment of the present invention in which:

FIG. 3 is a view taken along line 3—3 of FIG. 2 showing the lower manifold casting;

FIG. 4 is a view taken along line 4—4 of FIG. 2 showing the exhaust crossover heat transfer duct and the upper induction passage runners;

FIG. 5 is a view taken along line 5—5 of FIG. 2 showing the branched center section of the exhaust crossover passage;

FIG. 6 is a view taken along line 6—6 showing the exhaust crossover heat transfer duct and the lower induction passage runners; and FIG. 7 is a view taken along line 7—7 of FIG. 2 showing the branched inlet of the exhaust crossover heat transver duct.

Figure 1:
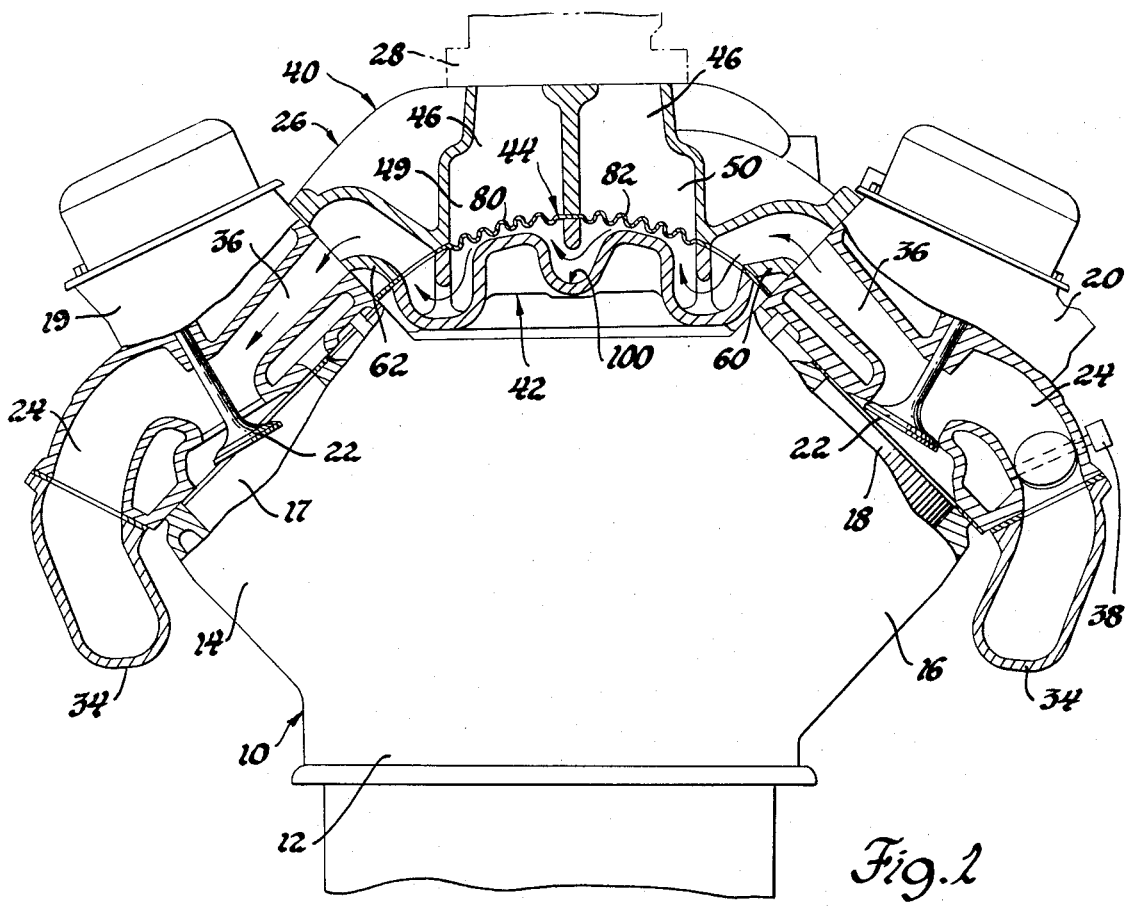
FIG. 1 is a partially sectioned end view of an internal combustion engine having an early fuel evaporation intake manifold made in accordance with the present invention.

Referring to the drawings, there is shown an internal combustion engine 10 of the V-type including a cylinder block 12 having a pair of angularly disposed cylinder banks 14 and 16. The banks 14 and 16 house a longitudinally aligned series of cylinders 17 and reciprocating pistons 18. Cylinder heads 19 and 20 are mounted on the outer ends of the cylinder banks 14 and 16, respectively. Conventionally actuated valves 22 in each of the cylinder heads control the intake and exhaust of gases to and from the engine cylinders 17 through inlet passages (not shown) and outlet passages 24. The inlet passages extend through the inboard surfaces of the cylinder heads 19, 20 and conduct an entering combustible fuel-air mixture to each of the cylinders from an early fuel evaporation conventional intake manifold 26 which bridges the space between the cylinder banks 14, 16. A carburetor 28 is centrally positioned on the top of the intake manifold 26. The outlet passages 24 are conventionally fluidly connected with exhaust manifolds 34 mounted on the outboard surfaces of the heads 19, 20. The outlet passages from one or more cylinders in each cylinder bank include an extension passage 36 extending transversely to the heads and opening through the inboard surfaces thereof.

The intake manifold 26 includes an exhaust crossover passage through which exhaust gases flow between the extension passages as indicated by the arrows. The flow through the crossover passage is regulated by a temperature responsive heat riser valve 38 on the right-hand exhaust manifold 34. The intake manifold 26 comprises an upper manifold casting 40, a lower manifold casting 42 and a combination hotplate and gasket 44, hereinafter referred to as a gasket plate.

The upper casting 40 includes laterally spaced primary riser bores 46 and secondary riser bores 48 communicating with the carburetor 28. (FIGS. 4 and 6) The left-hand primary and secondary riser bores terminate with a downwardly opening plenum 49 as shown in FIG. 4. The right-hand riser bores terminate with a downwardly opening plenum 50. (FIG. 2) The plenums 49, 50 are separated by a center wall 51. Conventional upper and lower induction passage runners 52, 54 in the casting communicating laterally between the cylinder head inlet passages and the plenums 49, 50 respectively. Thus, the intake manifold 26 as illustrated is a conventional double-level construction. However, the present invention is equally adaptable to a single level intake manifold construction.

The upper casting 40 also includes an exhaust passage inlet duct 60 registering with the exhaust extension passage 36 in the right cylinder bank 16 and an exhaust passage outlet duct 62 registering with the exhaust extension passage 36 in the left cylinder bank 14. The inlet duct 60 includes a cored passageway 64 having an inlet opening 66 in the right sidewall 67 and a discharge opening 68 in the lower surface 69 of the upper casting 40. The lower surface 69 is machined to a right cylindrical shape about a longitudinal axis. The outlet duct 62 includes a cored passageway 70 having an inlet opening 71 in the lower surface 69 and an outlet opening 72 in the left sidewall 74.

The gasket plate 44 is in the form of a low thermal mass embossed stainless steel plate having a thickness of around 0.040 in. The gasket plate 44 includes a pair of laterally spaced corrugated heat exchangers 80 and 82 registering with the plenums 49, 50 respectively and forming the floors therefor. The gasket plate 44 includes an intake opening 86 registering with the outlet opening 68 of the passageway 64 and an outlet opening 88 registering with the opening 71 of passageway 70.

The gasket plate 44 is adapted to conform to the lower cylindrical surface 69 of the upper casting 40. The gasket plate 44 is clamped between the surface 69 and the lower casting 42 by bolts 90.

Figure 2:
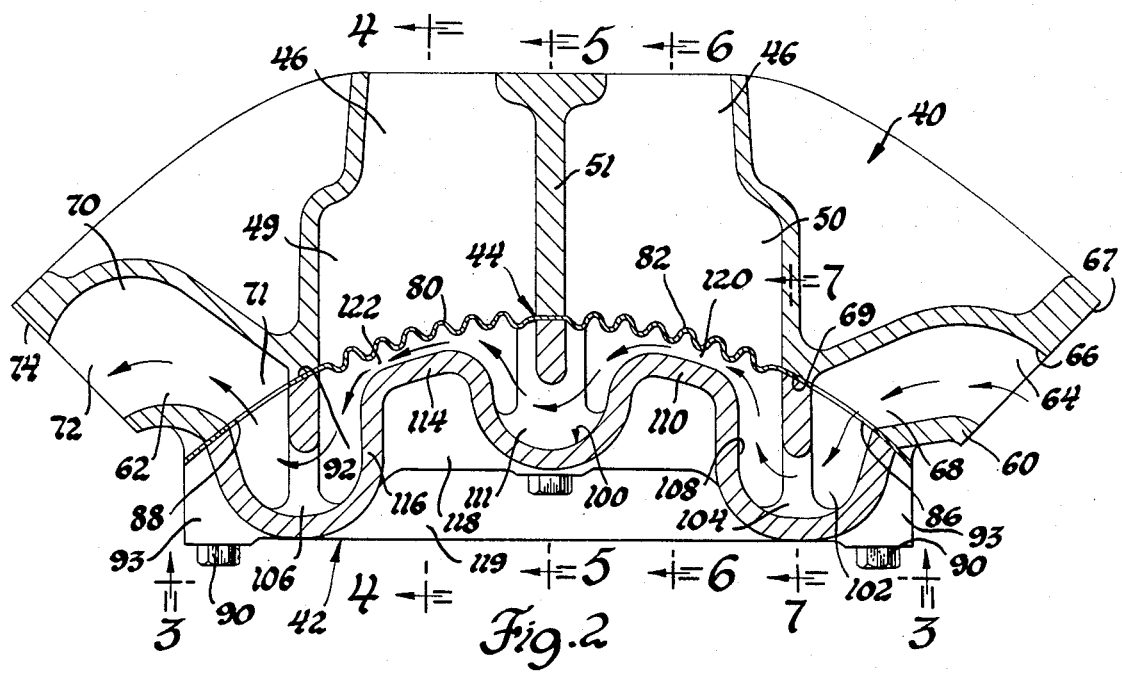
FIG. 2 is an enlarged sectional view of the intake manifold showing the exhaust crossover passage construction and exhaust gas flow therethrough.

The lower casting 42 as shown in FIGS. 2 and 3, is generally rectangular and has an upper cylindrical surface 92 conformable to the gasket plate 44 and the lower surface 69 of the upper casting 40. The lower casting 42 includes bosses 93 at each corner thereof and a center boss 94. The bosses 93, 94 include through holes for receiving the bolts 90 which are threaded into mating tapped holes in the lower surface of the upper casting 40. (FIG. 5) The bolts 90 apply a clamping load against the gasket 44 and the casting 42 to provide a gas tight seal.

The lower casting 42 includes a cored channel generally designated by the reference numeral 100. The channel 100 defines an undulating flow path between the openings 86 and 88. The channel includes a downward run 102 which divides into branch passages 104 separated by a web 105 as shown in FIG. 7. Similarly, the left-hand side of the lower casting 42 includes an upward exhaust passage 106 having an outlet communicating with openings 71 and 88 and having branch passages defined by a center web similar to the branch passages 104.

The lower casting 42 includes a center portion having an undulating cross sectional profile defined by an upwardly opening channel. More specifically the channel includes a right vertical end duct 108, a first laterally spaced dome section 110 adjacent heat exchanger 82, a center reverse bend 111 including branch sections 112 (FIG. 5), second laterally spaced dome sections 114 adjacent heat exchanger 80 and a left vertical duct 116.

As shown in FIGS. 3 and 6, the dome sections 110, 114 are separated by a central web 118 and are outwardly bounded by downwardly depending flanges 119. The dome sections 110, 114 are in close proximity of the heat exchangers 80, 82 and define therewith serially connected heat exchange ducts 120, 122 respectively. The ducts 120, 122 have a high aspect-ratio in that the width is considerably greater than the height. The ducts 120, 122 are also restrictive in that the flow areas thereof are substantially less than the inlet flow area. This flares the crossover flow beneath the heat exchangers 80, 82 and increases the velocity of the exhaust gases through the ducts 120, 122 producing a turbulent flow. This, in combination with the vertical run, results in an effective mass flow rate against the heat exchangers 80, 82 which breaks up the fluid film on the lower surfaces to effect rapid heating thereof.

In other words, as the exhaust gases from the combination chamber cylinders flow upwardly through vertical duct 108, the exhaust gases will directly impinge upon the heat exchanger 82. The flow passage is then vertically restricted and horizontally expanded through duct 120 such that substantially all of the exhaust gas flow will interact with the heat exchanger 82. This will result in a maximum thermal exposure of the exhaust gas to heat exchanger and promote a rapid rise in temperature during engine startup. Thereafter, the exhaust gases will be reversely directed by bend 111 from duct 120 and thereafter uwpardly directed for impingement against the heat exchanger 80. The dome section 114 defines with the heat exchanger 80 a restricted duct 122 having the same aspect-ratio as the duct 120. This provides a similar thermal exchange.

After exiting the duct 120, the exhaust gases are downwardly directed by the duct 116 then upwardly directed through exhaust passage 106 through openings 88 and 71. The gases discharge through opening 72 to the exhaust passageway extension 36. After predetermined engine temperature rise as sensed by suitable device responsive to coolant temperature or the like, the normally closed heat riser valve 38 opens to permit conventional exhausting by the right cylinder bank to the exhaust manifold 34. However, after the opening of the valve exhaust gas pulses will occur in the passageway such that the gasket 44 still experiences a measure of heating.

The effectiveness of the above-described exhaust flow path resides in the turbulent thermal interaction provided by the restrictive high aspect-ratio duct adjacent the heat exchangers. The fact that the exhaust gas is directed substantially normal to the heat exchanger at this point also increases the turbulence and presents the maximum exposure of exhaust gas to the heat exchange surfaces.

The exhaust crossover flow path is sized so as to raise the surface temperature of the heat exchanger sufficiently to provide the requisite fuel vaporization for a particular engine within a predetermined time after engine startup. This will prescribe the needed surface area at the heat exchangers. The necessary turbulence for effective heat transfer can then be prescribed with reference to the flow rate through the crossover passage. It has been empirically found that approximately 1.25 square inches of flow area is needed for each 200 cubic inches of engine displacement to insure sufficient gas velocity and turbulence in the ducts to break up the stagnant fluid film at the heat exchangers. In general, these two parameters can be interrelated by the aspect-ratio of the ducts. This ratio should be in excess of 10 and preferably around 20. A typical duct wherein exhaust gases are routed from four cylinders to the heat exchangers will have a 5 in. by 5 in. or 25 square inches of heat exchange surface and a duct height of about ¼ inch for an overall aspect-ratio of around 20.

The above-described two-piece casting with single embossed steel gasket provides a readily manufacturable intake manifold. Both manifold sections are cast using conventional coring techniques. The bolted construction with the gasket sandwiched therebetween ensures an exhaust gas tight seal between the intake passages and the exhaust crossover passage. While it is appreciated that many heat exchange surfaces can be provided for the aforementioned thermal transfer, it should be remembered that the aspect-ratio should be substantial and the passage be so configured that impingement of the exhaust gases occurs thereat.

Although only one form of this invention has been shown and described, other forms will be readily apparent to those skilled in the art. Therefore, it is not intended to limit the cope of this invention by the embodiment selected for the purpose of this disclosure but only by the claims which follow.

What is claimed is:

1. In combination with an internal combustion engine having a combustion chamber, an exhaust passage receiving exhaust gases from the combustion chamber, an early fuel evaporation intake manifold comprising: a first manifold member having an induction passage for delivering a mixture of fuel and air to the combustion chamber; a second manifold member; an opening in a surface of said first manifold member fluidly connected with said induction passage; a surface on said second manifold member mating with said surface of said first manifold member; a thin wall thermally conductive gasket positioned between said surfaces of said manifold members; means clamping said gasket between said manifold members; inlet means in said second manifold member fluidly connected to the exhaust passage; outlet means in said second manifold member fluidly connected with the exhaust passage; an upwardly opening channel in said surface of said second manifold member, said channel extending between the inlet means and the outlet means, said gasket defining with said channel a crossover flow passage between said inlet means and outlet means, said crossover flow passage being sufficiently restrictive to accelerate exhaust gas velocity and establish turbulent exhaust gas flow at said gasket to prevent a stagnant fluid film thereat to promote rapid heating of the latter such that any liquid fuel in said fuel mixture is rapidly heated and vaporized upon contact therewith.

2. An early fuel evaporation manifold for an internal combustion engine having a combustion chamber and exhaust gas outlet passages for receiving exhaust gases from the combustion chamber, said manifold including a first member and a second member, said first member having an induction passage adapted to be fluidly connected with a carburetor for delivering a mixture of fuel and air to the combustion chamber, an opening in the first member fluidly communicating with said induction passage, a first passage in one of said members having an inlet communicating with said exhaust outlet passage, a second passage in one of said members having an outlet fluidly connected with an exhaust outlet passage remote from the combustion chamber and said first exhaust outlet passage, a thin thermally conductive gasket engaging said first member, said gasket having a heat exchange surface covering said opening; a second member having a surface engaging the gasket and conformable to said surface of said first member; means for clamping the gasket and said second member against said first member, a channel in said second member opening toward said gasket in close proximity to said heat exchanger surface, said channel flaring thereat to define a high aspect-ratio restrictive exhaust gas crossover passage for accelerating exhaust gas velocity through the crossover passage to break up the fluid film at said heat exchanger surface, a duct connecting the first passage and the crossover passage and disposed at an angle with respect to the heat exchanger such that the exhaust gases are directed against the heat exchange surface and spread out through said crossover passage for maximum heat transfer therewith, the heat exchange surface is effective to vaporize any liquid impinging thereupon.

3. An early fuel evaporation manifold for internal combustion engine having a pair of angularly disposed banks of cylinders including exhaust outlet passages, said manifold comprising an upper casting adapted to have a carburetor mounted on an upper surface thereof for delivering a mixture of fuel and air to the combustion chamber; a plurality of vertically extending riser bores having inlets adapted to be fluidly connected with said carburetor and downwardly terminating with plenums having openings at the lower surface thereof, induction passages in said upper casting for fluidly connecting said plenums with said combustion chamber, a first exhaust passage extending laterally on one side of said manifold having an inlet communicating with one of said exhaust passages on one of the cylinder banks, said first exhaust passage discharging at a lower surface of the upper casting, a second exhaust passage extending laterally on the other side of said upper casting having an outlet communicating with one of the exhaust passages on the other of the cylinder banks and having an inlet in the lower surface of said upper casting, a thin thermally conductive gasket engaging the lower surface of said upper casting, said gasket having heat exchange surfaces covering the openings in said plenums, said gasket having openings therein registering with said first and second exhaust passages, a lower casting having an upper surface engaging said gasket and conformable to the lower surface of said upper casting, bolts clamping the lower casting and gasket against said upper casting, an undulating cored channel formed in said lower casting having an inlet fluidly communicating with said first exhaust passage and an outlet fluidly communicating with said second exhaust passage, said channel including a vertical duct terminating at a first dome section lying in close proximity with one of the heat exchangers, a V-shaped center section including another vertical duct terminating at a second dome section lying in close proximity to another of the heat exchangers, said channel and said gasket defining an exhaust crossover passage at said dome sections having a restrictive flow area for accelerating the exhaust gas flow therethrough and having a width greater than ten times the height thereat thereby establishing a restrictive high aspect-ratio duct such that the exhaust gases leaving said vertical ducts are directed substantially normal to the heat exchangers and spread out through said crossover passage at a high velocity turbulent flow therethrough and for maximum heat transfer therewith, said exhaust crossover passage discharging at said second exhaust passage with a downwardly extending vertical passage whereby an exhaust gas flow through said crossover passage is effective to rapidly heat said heat exchanger such that any liquid fuel impinging thereupon is rapidly evaporated therefrom.

* * * * *